(12) United States Patent
Harazono et al.

(10) Patent No.: US 7,951,447 B2
(45) Date of Patent: May 31, 2011

(54) METHOD AND APPARATUS FOR MANUFACTURING PREPREG SHEET AND PREPREG SHEET

(75) Inventors: Masaaki Harazono, Shiga (JP); Toshihiro Matsumoto, Shiga (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/525,271

(22) PCT Filed: Jan. 31, 2008

(86) PCT No.: PCT/JP2008/051458
§ 371 (c)(1),
(2), (4) Date: Jul. 30, 2009

(87) PCT Pub. No.: WO2008/093757
PCT Pub. Date: Aug. 7, 2008

(65) Prior Publication Data
US 2010/0062249 A1    Mar. 11, 2010

(30) Foreign Application Priority Data

Jan. 31, 2007 (JP) ................................. 2007-022203

(51) Int. Cl.
*B32B 27/04* (2006.01)
(52) U.S. Cl. ................... 428/297.4; 428/298.1; 428/339
(58) Field of Classification Search ............... 428/292.1, 428/209, 339, 297.4, 298.1; 361/792
See application file for complete search history.

(56) References Cited

U.S. PATENT DOCUMENTS

| | | | |
|---|---|---|---|
| 4,814,945 A * | 3/1989 | Leibowitz | 361/792 |
| 4,943,334 A | 7/1990 | Medney et al. | 156/174 |
| 5,376,326 A | 12/1994 | Medney et al. | 264/510 |
| 5,478,421 A | 12/1995 | Medney et al. | 156/174 |
| 5,512,224 A | 4/1996 | Medney et al. | 264/102 |
| 5,543,005 A | 8/1996 | Monget et al. | 156/93 |
| 5,642,679 A | 7/1997 | Monget et al. | 112/470.13 |
| 5,662,761 A | 9/1997 | Middelman et al. | 156/324 |
| 5,874,152 A | 2/1999 | Meddelman | 428/105 |
| 6,207,259 B1 * | 3/2001 | Iino et al. | 428/209 |
| 6,548,153 B2 * | 4/2003 | Kataoka et al. | 428/209 |
| 6,592,979 B1 | 7/2003 | Deteresa et al. | 428/293.4 |
| 6,899,960 B2 | 5/2005 | Shi et al. | 428/620 |
| 7,179,684 B2 | 2/2007 | Shi et al. | 438/108 |
| 7,786,001 B2 * | 8/2010 | Buchwalter et al. | 438/613 |
| 7,790,268 B2 * | 9/2010 | Kennedy | 428/209 |
| 7,794,803 B2 * | 9/2010 | Hashimoto et al. | 428/1.3 |
| 7,800,216 B2 * | 9/2010 | Inagaki et al. | 257/700 |
| 2003/0190477 A1 | 10/2003 | Shi et al. | 428/413 |
| 2005/0196906 A1 | 9/2005 | Shi et al. | 438/125 |
| 2010/0062249 A1 * | 3/2010 | Harazono et al. | 428/339 |

FOREIGN PATENT DOCUMENTS

| | | |
|---|---|---|
| JP | 07-137163 | 5/1995 |
| JP | 07-290452 | 11/1995 |
| JP | 10-508720 | 8/1998 |
| JP | 2002-198658 | 7/2002 |
| JP | 2004-306265 | 11/2004 |
| JP | 2005-029912 | 2/2005 |
| WO | WO 96/09158 A1 | 3/1996 |

* cited by examiner

*Primary Examiner* — N. Edwards
(74) *Attorney, Agent, or Firm* — DLA Piper LLP (US)

(57) ABSTRACT

According to the present invention, a method for manufacturing a prepreg sheet includes steps of (A) forming a resin layer 61 on a surface of a supporter 3, (B) winding a reinforcing yarn 10 around the resin layer 61, and (C) embedding at least a part of the reinforcing yarn 10 in the resin layer 61. Preferably, in step (C), the surface of the supporter 3 is relatively moved towards the reinforcing yarn 10.

6 Claims, 19 Drawing Sheets

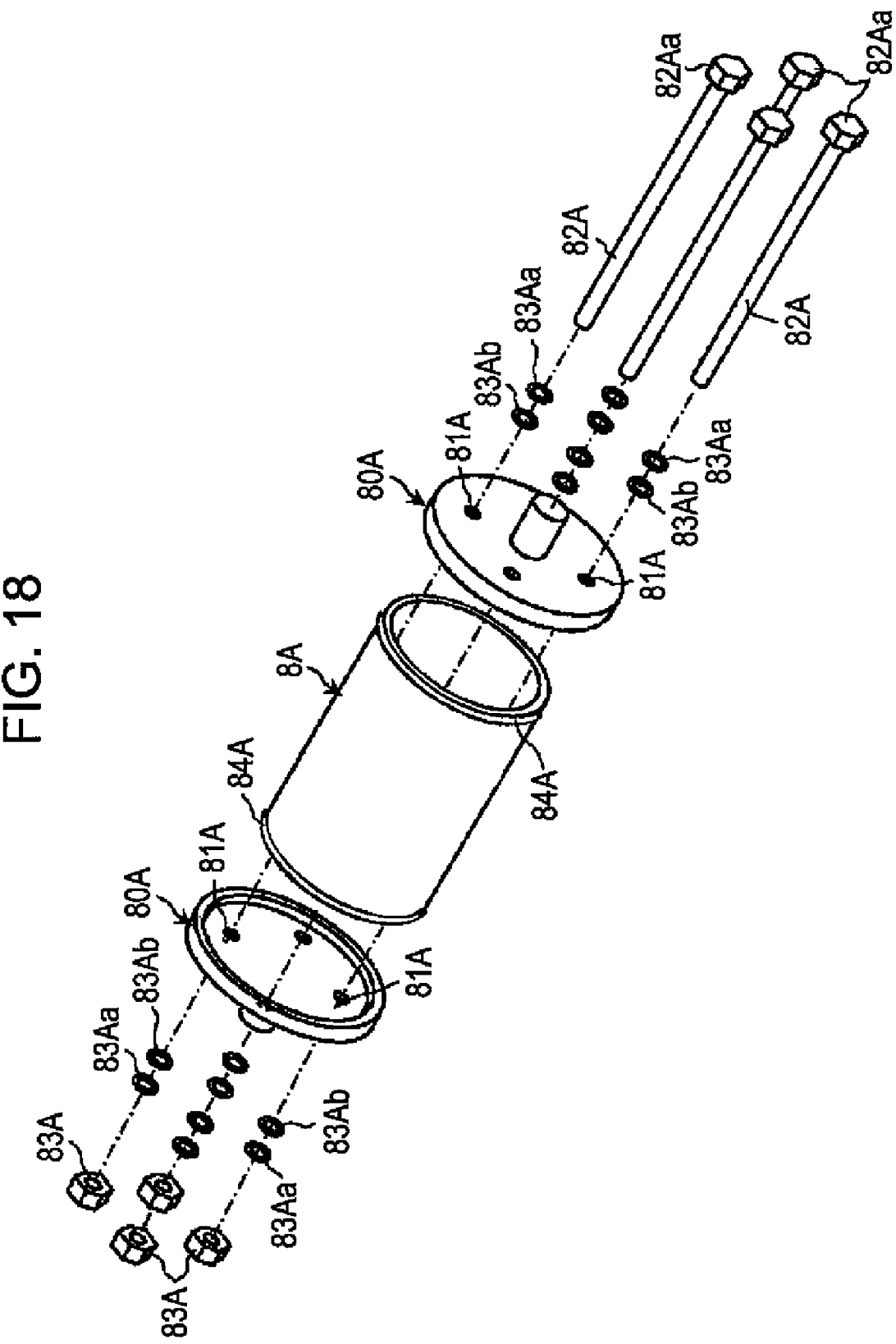

METHOD AND APPARATUS FOR MANUFACTURING PREPREG SHEET AND PREPREG SHEET

CROSS-REFERENCE TO THE RELATED APPLICATIONS

This application is a national stage of international application No. PCT/JP2008/051458 filed on Jan. 31, 2008, which also claims the benefit of priority under 35 USC 119 to Japanese Patent Application No. 2007-022203 filed on Jan. 31, 2007, the entire contents of which are incorporated herein by reference.

TECHNICAL FIELD

The present invention relates to a prepreg sheet used for manufacturing a circuit board and technology for manufacturing the prepreg sheet.

BACKGROUND ART

Examples of prepreg include a plain fabric of inorganic fibers, such as glass fibers, or organic fibers, such as resin fibers, containing heat-curable resin impregnant, such as epoxy resin impregnant (refer to, for example, Patent Document 1).

Since a fabric has irregularities on the surface thereof, the irregularities easily appear on a produced prepreg described in Patent Document 1. Accordingly, the prepreg described in Patent Document 1 has a problem in smoothness. In particular, since a conductor circuit pattern is formed on a surface of a prepreg used for producing a circuit board, a sufficient smoothness of the surface of the prepreg is required.

In addition, a uni-direction (UD) prepreg including a parallel fiber group having a plurality of parallel fibers arranged therein and containing heat-curable resin impregnant has been developed (refer to, for example, Patent Document 2). A UD prepreg is formed by spreading twist yarn using a fiber spreading apparatus so as to generate a parallel fiber group of the spread fibers and impregnating the parallel fiber group with a heat-curable resin (refer to, for example, Patent Document 3).

[Patent Document 1] Japanese Unexamined Patent Application Publication No. 2002-198658

[Patent Document 2] Japanese Examined Patent Application Publication No. 10-508720

[Patent Document 3] Japanese Unexamined Patent Application Publication No. 2005-29912

DISCLOSURE OF INVENTION

Problems to be Solved by Invention

However, it is more difficult to handle a plurality of fibers that are unwoven than handling a woven cloth. For unwoven fibers, before a resin is impregnated in a bundle of a plurality of fibers (a parallel fiber group), the fibers in the bundle may be separated, or a gap may be formed between the fibers. If a resin is impregnated in the fibers having a gap therebetween, the portion having the gap is easily broken. Thus, a problem with respect to strength may arise.

The present invention provides a prepreg sheet that can be easily handled and that has a high surface smoothness and a sufficient strength.

Means for Solving the Problems

According to a first aspect of the present invention, a method for manufacturing a prepreg sheet is provided. The method includes steps of (A) forming a resin layer on a surface of a supporter, (B) winding a reinforcing fiber around the resin layer, and (C) embedding at least a part of the reinforcing fiber in the resin layer.

According to a second aspect of the present invention, an apparatus for manufacturing a prepreg sheet is provided. The apparatus includes a supporter on which a resin layer is to be formed, a fiber holder for holding a reinforcing yarn to be wound around the resin layer, and a fiber embedding member for embedding at least a part of the reinforcing yarn in the resin layer by relatively moving a surface of the supporter towards the reinforcing yarn wound around the supporter.

According to a third aspect of the present invention, a prepreg sheet is provided. The prepreg sheet has a resin layer which includes a first surface resin layer (i.e., a first surface), a second surface resin layer (i.e., a second surface), and a fiber bundle (i.e., a fiber region) disposed between the first surface resin layer (i.e., a first region) and the second surface resin layer (i.e., a second region). The second region contains more filler than the first region.

Advantages

According to the present invention, a prepreg sheet that facilitates handling of fibers and that has a high surface smoothness and a sufficient strength can be provided. In addition, a method and an apparatus for manufacturing the prepreg sheet can be provided.

BRIEF DESCRIPTION OF DRAWINGS

FIG. 18 is an exploded perspective view illustrating a supporter and the vicinity of the supporter according to a second embodiment of the present invention.

REFERENCE NUMERALS

Figure 1:
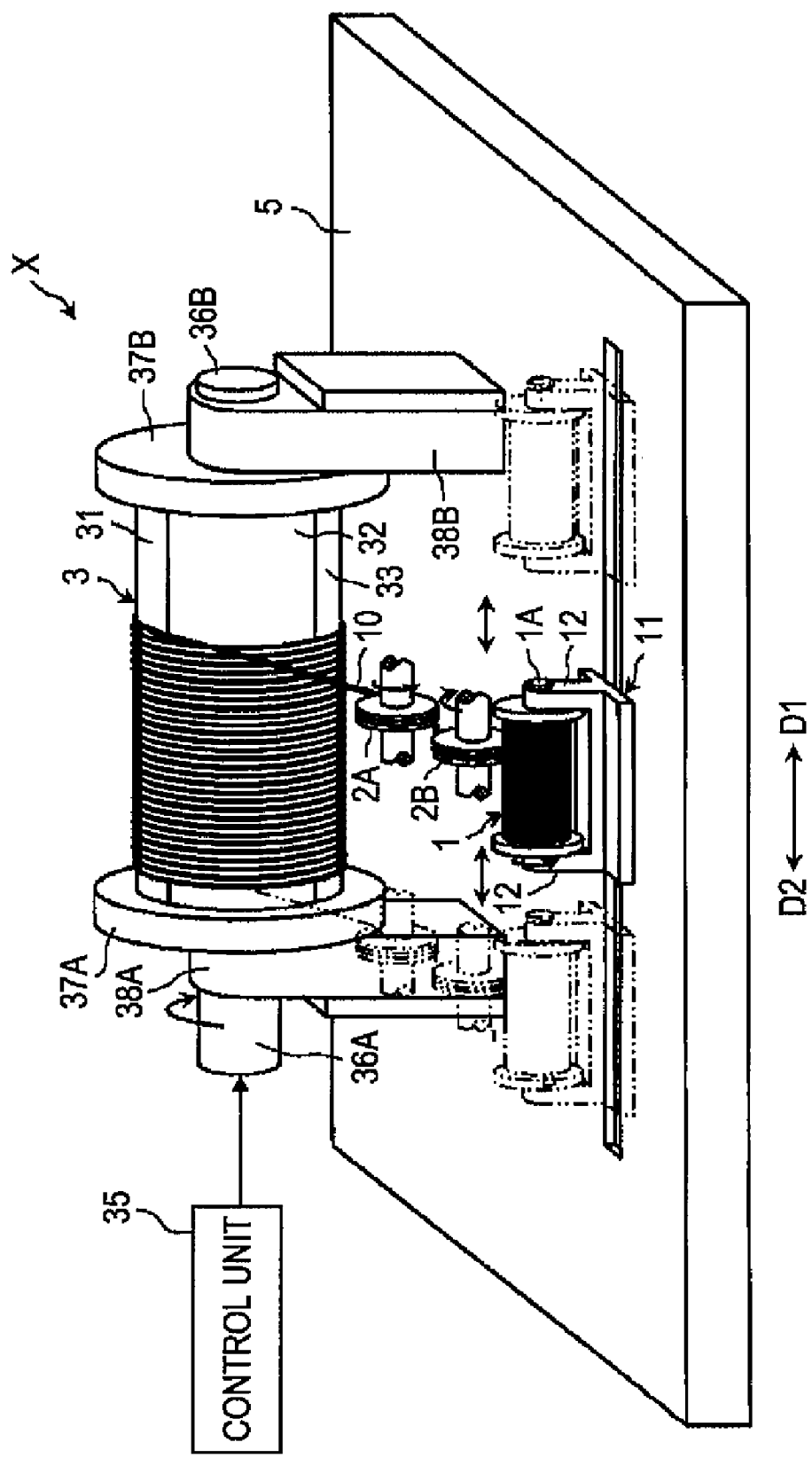
FIG. 1 is a perspective view schematically illustrating the configuration of an apparatus for manufacturing a prepreg according to a first embodiment of the present invention.

X prepreg sheet manufacturing apparatus
1 fiber roll (reinforcing yarn holding means)
10 reinforcing yarn
3, 3', 3", 8A, 8A', 8A", 8B, 8C supporter
30 hollow center portion (of supporter)
31-34 pressing member (of supporter)
60, 68A release sheet
61, 68B, 80C resin layer
62 first prepreg sheet intermediate member
69 second prepreg sheet intermediate member
80B heater (reinforcing yarn embedding means)

BEST MODES FOR CARRYING OUT THE INVENTION

First to fourth embodiments of the present invention are described below with reference to the accompanying drawings.

The first embodiment of the present invention is described first with reference to FIGS. 1 to 16.

A prepreg sheet manufacturing apparatus X shown in FIG. 1 manufactures a uni-direction (UD) prepreg sheet including a plurality of fibers aligned in parallel embedded in a matrix resin serving as a surface resin layer or a crisscrossed UD prepreg sheet including a plurality of fibers having different alignment directions embedded in a matrix resin.

The prepreg sheet manufacturing apparatus X includes a fiber roll 1, a pair of drive rollers 2A and 2B, and a supporter 3.

The fiber roll 1 is formed by winding a reinforcing yarn 10. The fiber roll 1 is supported by a slider 11 in a rotatable manner about a shaft portion 1A. The slider 11 is reciprocally slidable on a stage 5 in D1 and D2 directions using, for example, a rack and pinion mechanism. The slider 11 includes a pair of stays 12. The stays 12 support the shaft portion 1A of the fiber roll 1 so that the shaft portion 1A is rotatable. In this way, the fiber roll 1 is rotatable with respect to the slider 11 and is relatively movable with respect to the stage 5 in the D1 and D2 directions together with the slider 11.

A filament yarn formed from a filament of a single fiber or a plurality of filaments can be used as the reinforcing yarn 10 wound around the fiber roll 1. The filament yarn may be a single yarn or a twisted yarn. However, for ease of a spreading operation and an alignment operation, it is desirable that the filament yarn be a single yarn.

It is desirable that the diameter of a single fiber of the reinforcing yarn 10 is, for example, greater than or equal to 5 µm and is less than or equal to 20 µm (the number of single yarns in a reinforcing yarn are 20 to 200). In addition, it is desirable that the single fiber is formed from a material that does not excessively soften and expands at a temperature used when the reinforcing yarn 10 is embedded in the resin layer. For example, the linear coefficient of expansion in the length direction is greater than or equal to −10 ppm/° C. and less than or equal to 0 ppm/° C. (in the range from 25° C. to 200° C.). In addition, the glass-transition temperature is greater than or equal to 50° C. and less than or equal to 150° C. Examples of a fiber material of such a single fiber include a wholly aromatic polyester fiber and an organic fiber consisting primarily of wholly aromatic polyamide, polybenzoxazole, or liquid crystal polymer. For a fiber material of the reinforcing yarn, a glass fiber (e.g., S glass, T glass, or M glass with more than or equal to 50 wt % of silicon oxide and less than or equal to 30 wt % of calcium oxide and, more preferably, a glass material with more than or equal to 60 wt % of silicon oxide and less than or equal to 10 wt. % of calcium oxide) or a carbon fiber having carbon as a main component can be used.

The two drive rollers 2A and 2B are used for guiding the reinforcing yarn 10 of the fiber roll 1 to the supporter 3. The drive rollers 2A and 2B are rotatable in the directions indicated by arrows in the drawing. Although not clearly shown in the drawing, the drive rollers 2A and 2B are integrated into the fiber roll 1 so as to be reciprocally movable in the D1 or D2 direction together with the fiber roll 1.

Figure 5A:
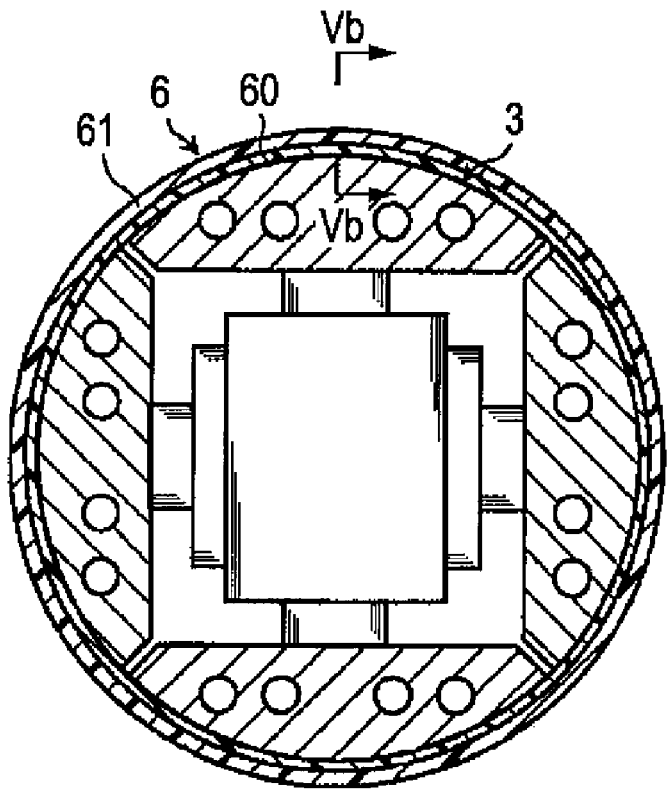
FIG. 5A is a cross-sectional view of the resin secured to the supporter and corresponds to FIG. 3.
Figure 5B:
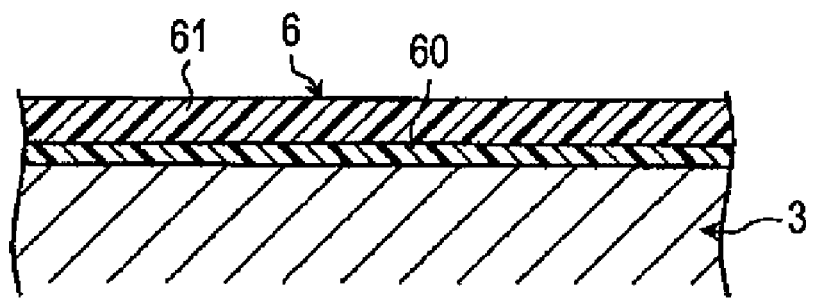
FIG. 5B is a cross-sectional view taken along a line Vb-Vb in FIG. 5A.

The supporter 3 provides a working space in which the reinforcing yarn 10 is wound around a resin layer 61 described below (refer to FIGS. 5A and 5B). In addition, the supporter 3 allows the reinforcing yarn 10 to be embedded in the resin layer 61.

Figure 2:
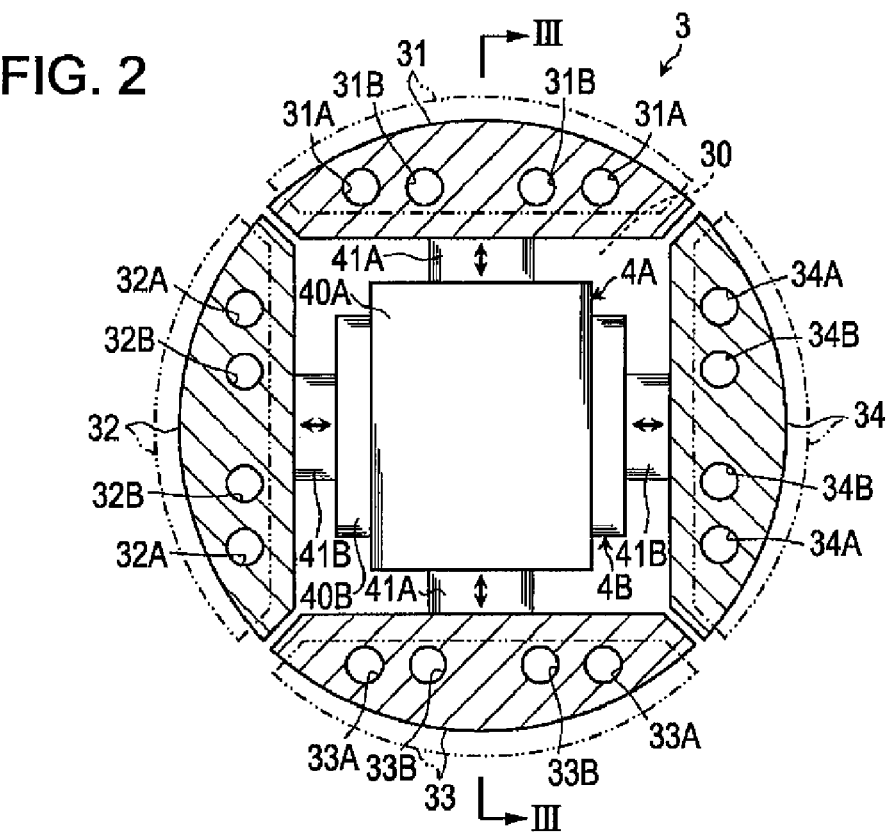
FIG. 2 is a cross-sectional view of a supporter in the apparatus for manufacturing a prepreg shown in FIG. 1.
Figure 3:
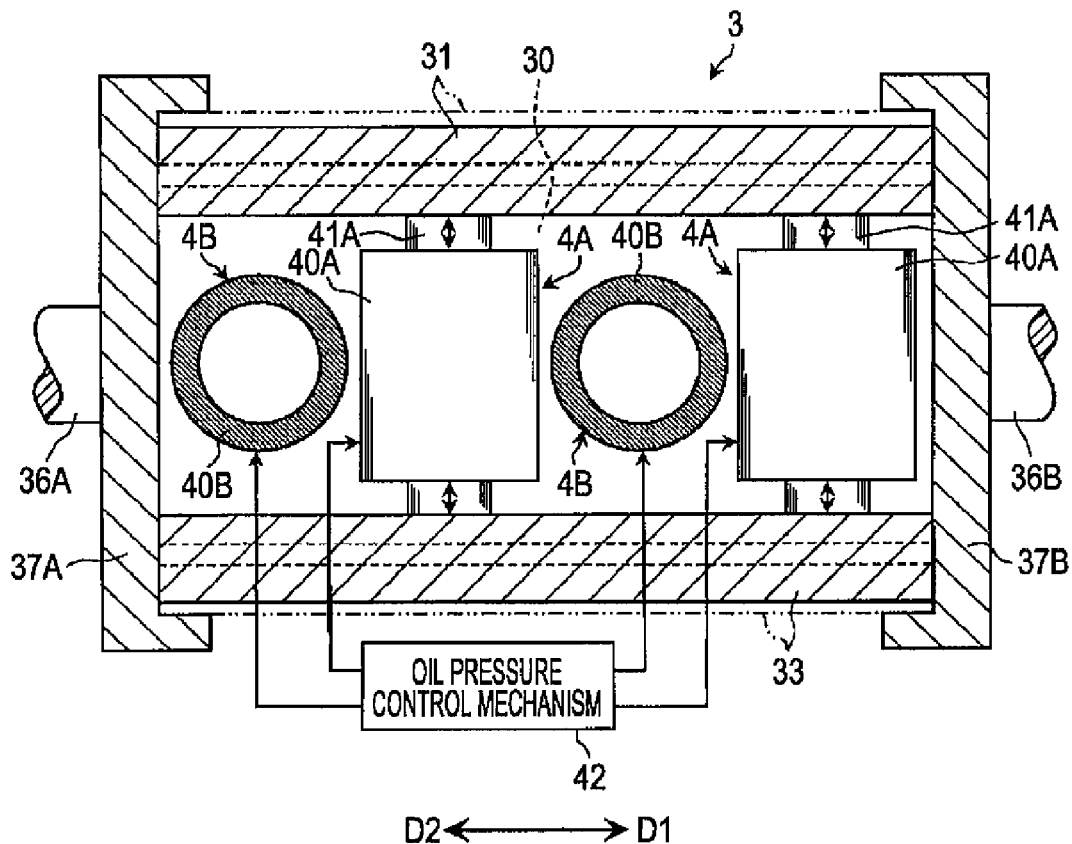
FIG. 3 is a cross-sectional view taken along a line III-III in FIG. 2.

As illustrated in FIGS. 2 and 3, the supporter 3 comprises pressing members 31, 32, 33, and 34 so as to have a cylindrical shape with a hollow center portion 30 formed therein. The supporter 3 is rotatable in the circumferential direction by applying a rotational force from a control unit 35 (refer to FIG. 1) including, for example, a motor (not shown). More specifically, as shown in FIGS. 1 and 3, flanges 37A and 37B including shaft portions 36A and 363, respectively, are attached to one end of the supporter 3 in the axis direction D1 and the other end in the axis direction D2, respectively. The flanges 37A and 37B are movable together with the supporter 3 (the pressing members 31 to 34). The shaft portions 36A and 36B are rotatably supported by support legs 38A and 383 secured to the stage 5, respectively. The shaft portion 36A is coupled with the motor (not shown) in the control unit 35. Thus, a rotational force for rotating the supporter 3 can be input to the shaft portion 36A. Accordingly, by appropriately controlling the rotation speed and the rotation direction input from the control unit 35 to the shaft portion 36A, the rotation speed and rotation direction of the supporter 3 can be controlled.

As shown in FIG. 2, the pressing members 31 to 34 include through-holes 31A to 34A and through-holes 31B to 34B each extending in the axis directions D1 and D2 of the supporter 3, respectively. Each of the through-holes 31A to 34A allows a heating medium (e.g., hot water, hot oil, or steam) to pass therethrough. By passing a heating medium through through-holes 31A to 34A, the pressing members 31 to 34 can be heated. In contrast, each of the through-holes 313 to 343 allows a cooling medium (e.g., cold water) to pass therethrough. By passing a cooling medium through through-holes 31B to 34B, the pressing members 31 to 34 can be cooled.

The size of the supporter 3 can be designed in accordance with the size of the prepreg sheet to be manufactured. For example, in order to manufacture a relatively small prepreg sheet, the diameter of the supporter 3 is set to a value greater than or equal to 5 cm and less than or equal to 30 cm. The length of the supporter 3 in the axis direction is set to a value greater than or equal to 20 cm and less than or equal to 100 cm. In contrast, in order to manufacture a relatively large prepreg sheet, the diameter of the supporter 3 is set to a value greater than or equal to 50 cm and less than or equal to 2 m. The length of the supporter 3 in the axis direction is set to a value greater than or equal to 1.5 m and less than or equal to 6 m. In addition, in order to optimally obtain the heating effect of the heating medium and the cooling effect of the cooling medium, it is desirable that a material of the supporter 3 (the pressing members 31 to 34) have a high heat conductivity. For example, a metallic material, such as stainless steel, copper, or aluminum, is used as the material of the supporter 3.

As illustrated in FIGS. 2 and 3, a plurality of piston mechanisms 4A and 4B (four in the drawings) are disposed in the hollow center portion 30 of the supporter 3. In the piston mechanisms 4A and 4B, pistons 41A and 41B are disposed in and supported by cylinders 40A and 40B containing oil so as to reciprocally move in the cylinders 40A and 40B, respectively. Each of the pistons 41A is coupled with the pressing members 31 and 32, while each of the pistons 41B is coupled with the pressing members 32 and 34. The cylinders 40A and 40B are connected to an oil pressure control mechanism 42 including an oil tank, a bulb, and an oil pressure pump. That is, the oil pressures in the cylinders 40A and 40B can be controlled by the oil pressure control mechanism 42. Accordingly, by controlling the oil pressures in the cylinders 40A and 40B, the pistons 41A and 41B can be reciprocally moved in the cylinders 40A and 40B, respectively. In addition, as noted above, the piston 41A is coupled with the pressing members 31 and 33, and the piston 41B is coupled with the pressing members 32 and 34. Accordingly, by moving the pistons 41A and 41B using the oil pressure control mechanism 42, each of the pressing members 31 to 34 can be moved so that the diameter of the whole supporter 3 can be increased or decreased.

Note that, in place of the oil pressure control mechanism 42, a gas pressure control mechanism can be used for moving the pistons 41A and 41B and, therefore, the pressing members 31 to 34 can be moved.

A method for manufacturing a prepreg sheet using the prepreg sheet manufacturing apparatus X is described next with reference to the case in which a filament yarn is used as the reinforcing yarn 10.

Figure 4:
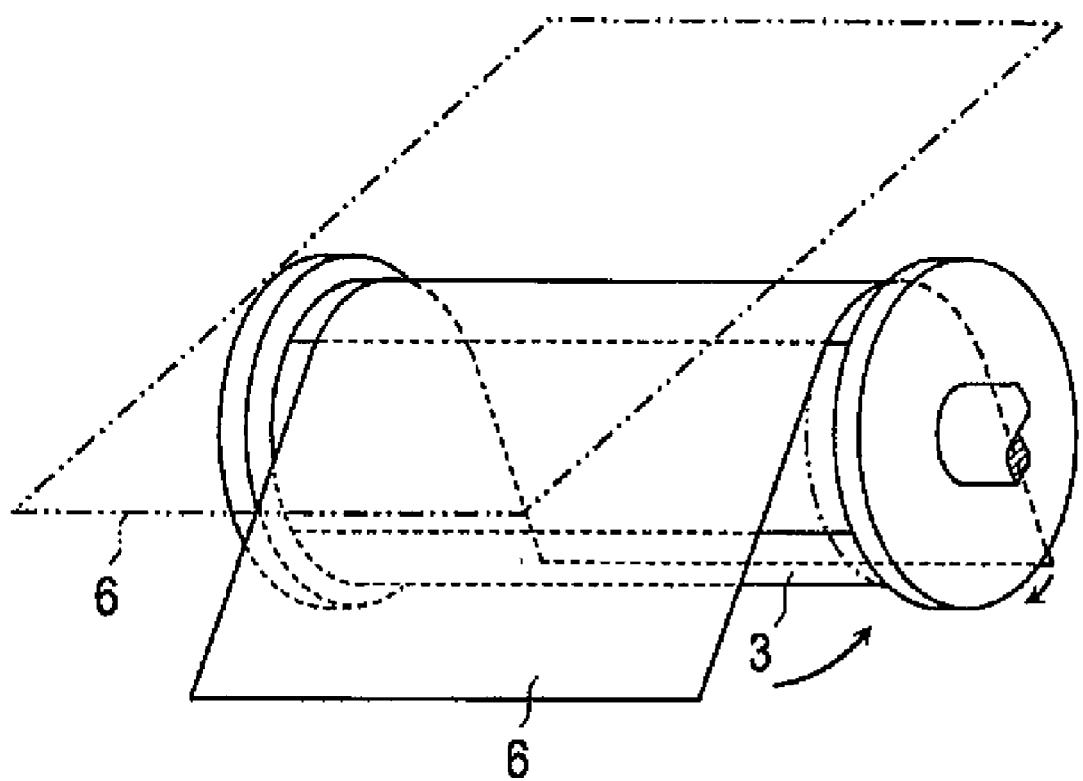
FIG. 4 is a perspective view illustrating a step of securing a resin sheet on the supporter.

In order to manufacture a prepreg sheet, as shown in FIG. 4, a resin sheet 6 is secured to the supporter 3 first. As shown in FIGS. 5A and 5B, the resin sheet 6 is produced by forming the resin layer 61 on a surface of a release sheet 60. The resin sheet 6 is secured to the supporter 3 so that the release sheet 60 is in contact with the surface of the supporter 3 and the resin layer 61 is exposed to the outside.

The release sheet 60 is used to support the resin layer 61 and to improve the ease of handling of the resin sheet 6. In addition, the release sheet 60 prevents the resin layer 61 from being adhered to the supporter 3. For example, the release sheet 60 is formed from polyethylene terephthalate (PET) having a thickness greater than or equal to 20 μm and less than or equal to 50 μm. The release sheet 60 can be formed of polytetrafluoroethylene-based resin, polyolefin-based resin, or polyimide-based resin. Alternatively, a material surface-processed by Si can be used for the release sheet 60.

The resin layer 61 serves as a matrix resin used for embedding the reinforcing yarn 10 in the prepreg sheet. The resin layer 61 is formed of uncured heat-curable resin. For example, the thickness of the resin layer 61 is greater than or equal to 5 μm and less than or equal to 30 μm. Examples of a heat-curable resin used for the resin layer 61 include a variety of resins used for matrix resin of prepreg sheet, such as an epoxy resin, a polyimide resin, a fluorine resin, a phenol resin, a polyphenylene ether (PPE) resin, a bismaleimide triazine (BT) resin, and a cyanate resin.

Subsequently, as shown in FIG. 1, the reinforcing yarn 10 is engaged with the drive rollers 2A and 2B, and an end portion of the reinforcing yarn 10 is secured to the supporter 3 or the resin layer 61. Thereafter, the control unit 35 rotates the supporter 3. Thus, the reinforcing yarn 10 is drawn from the fiber roll 1 and is wound around the resin layer 61 on the supporter 3. The speed at which the reinforcing yarn 10 is wound around the resin layer 61 (the speed at which the reinforcing yarn 10 is drawn from the fiber roll 1) is, for example, higher than or equal to 1 cm/sec and lower than or equal to 300 cm/sec. The tensional force for winding the reinforcing yarn 10 is, for example, higher than or equal to 0.0001 N and lower than or equal to 0.1 N for a single fiber. More preferably, the tensional force is higher than or equal to 0.0004 N and lower than or equal to 0.03 N.

While the supporter 3 is being rotated (while the reinforcing yarn 10 is being wound around the resin layer 61), the slider 11 is moved in the D1 direction. Accordingly, the fiber roll 1 is moved in the D1 direction together with the slider 11. As a result, a wound position of the reinforcing yarn 10 is moved in the D1 direction.

Figure 6A:
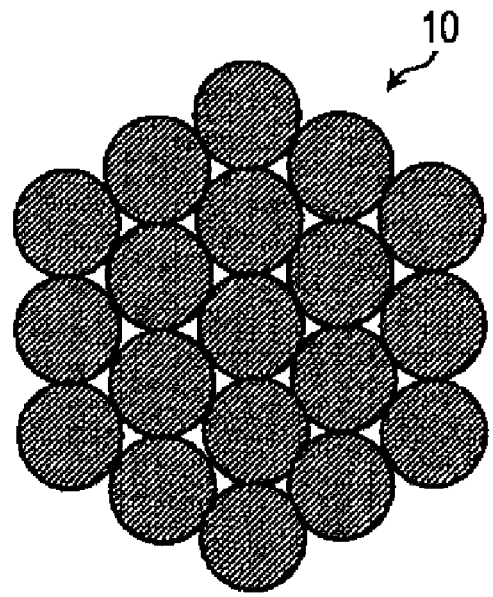
FIG. 6A is a cross-sectional view of a fiber bundle before the fiber bundle passes through a drive roller.
Figure 6B:
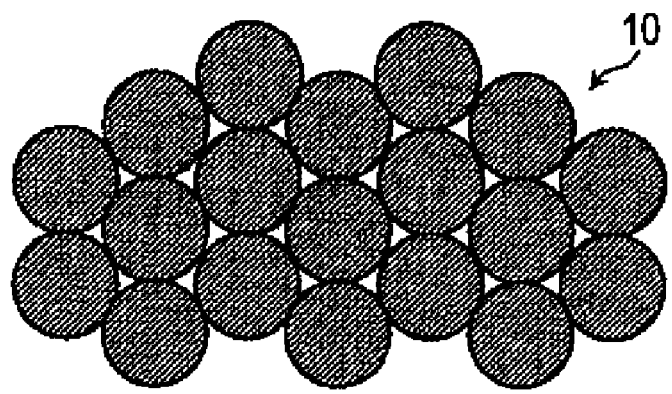
FIG. 6B is a cross-sectional view of the fiber bundle after the fiber bundle passes through the drive roller.

The reinforcing yarn 10 drawn from the fiber roll 1 passes through the two drive rollers 2A and 2B before being wound around the resin layer 61. The reinforcing yarn 10 in the form of a filament yarn is changed from a cylindrical fiber bundle as shown in FIG. 6A to a flat fiber bundle as shown in FIG. 6B. Accordingly, when the fiber roll 1 is moved in the D1 direction together with the slider 11 and, therefore, the wound position of the reinforcing yarn 10 is continuously moved in the axis direction of the supporter 3, a flat fiber group in which, as shown in FIGS. 7A and 7B, a single fiber is stacked into multiple layers is formed on the surface of the resin layer 61.

When the winding operation of the reinforcing yarn 10 around the resin layer 61 is completed, each of the pressing members 31 to 34 of the supporter 3 is moved outwardly in the radial direction of the supporter 3, as indicated by an imaginary line in FIGS. 2 and 3. Such movement of the pressing members 31 to 34 is caused by the oil pressure control mechanism 42 that moves the pistons 41A and 41B of the piston mechanisms 4A and 4B in the outward radial direction. The movement distance of the pistons 41A and 41B in the radial direction, that is, the movement distance of each of the pressing members 31 to 34 in the outward radial direction is determined in accordance with the thickness of the resin layer 61 of the resin sheet 6 and the level at which the reinforcing is embedded in the resin layer 61. However, the movement distance is set so as to be smaller than the thickness of the resin layer 61. For example, when the thickness of the resin layer 61 is greater than or equal to 5 μm and less than or equal to 30 μm, the movement distance of each of the pressing members 31 to 34 is set to a value greater than or equal to 2 μm and less than or equal to 25 μm.

Before the pressing members 31 to 34 are moved in the outward radial direction, the pressing members 31 to 34 are heated by passing a heating medium through the through-holes 31A to 34A of the pressing members 31 to 34. Thus, the resin layer 61 is heated by the pressing members 31 to 34 and is softened so as to have a desired viscosity. The heating temperature applied to the pressing members 31 to 34 is determined in accordance with the composition (the heat-curability) of the resin layer 61 and a desired viscosity of the resin layer 61. For example, when the cure temperature of the resin layer 61 is higher than 150° C. and a desired viscosity is higher than or equal to 300 Pa·s and lower than or equal to 3000 Pa·s, the heating temperature of the pressing members 31 to 34 is higher than or equal to 30° C. and lower than or equal to 150° C.

Figure 7A:
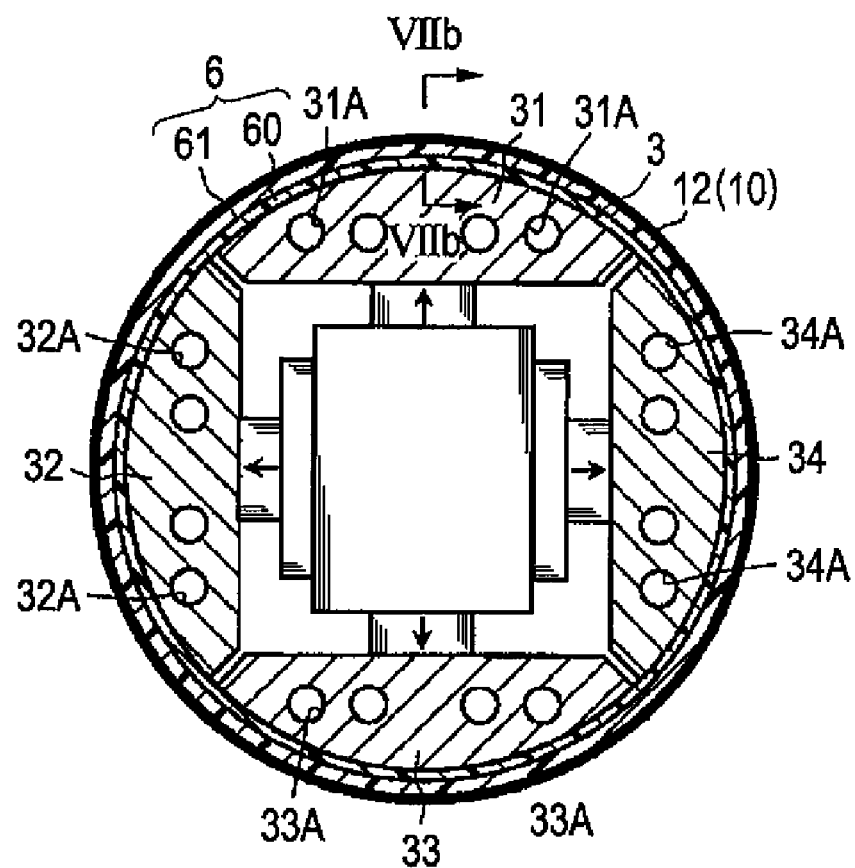
FIG. 7A is a cross-sectional view of the fiber bundle wound around the resin sheet and corresponds to FIG. 3.
Figure 7B:
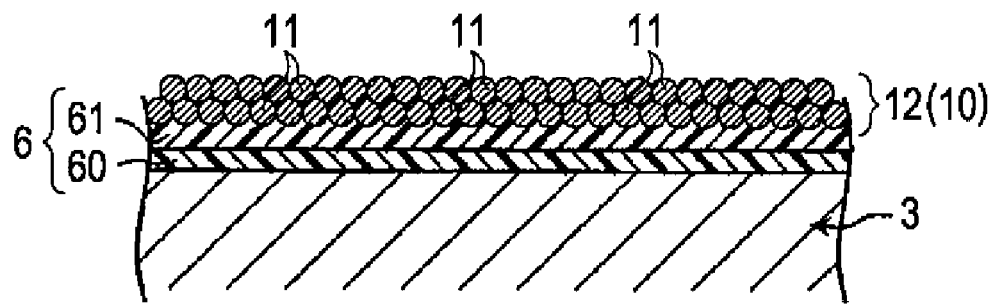
FIG. 7B is a cross-sectional view taken along a line VIIb-VIIb in FIG. 7A.
Figure 8A:
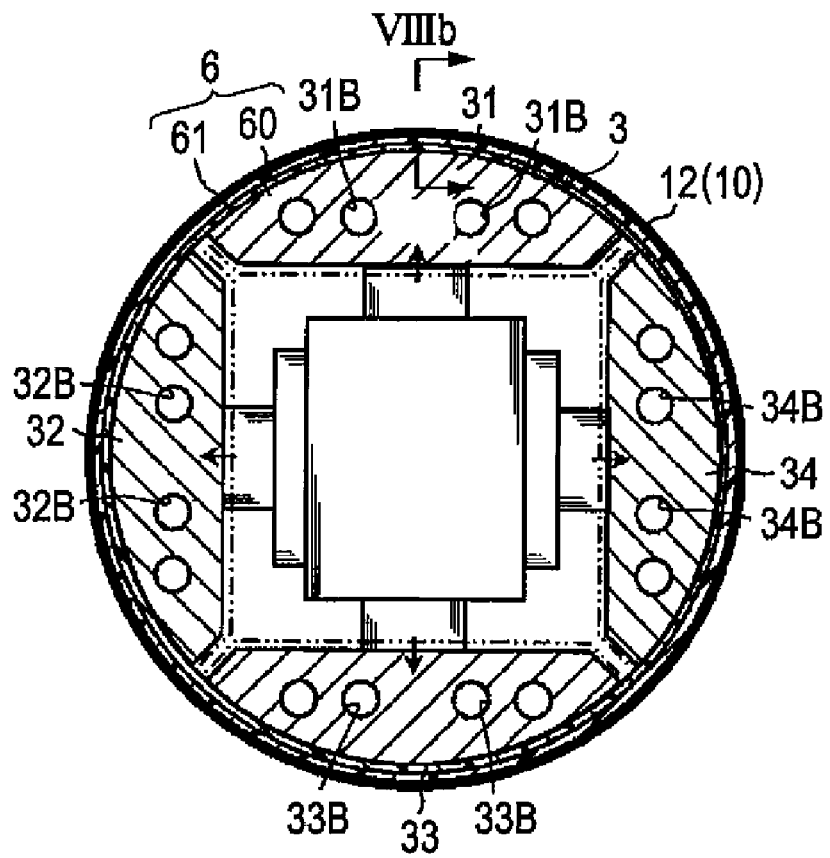
FIG. 8A is a cross-sectional view of the fiber bundle embedded in the resin sheet and corresponds to FIG. 3.
Figure 8B:
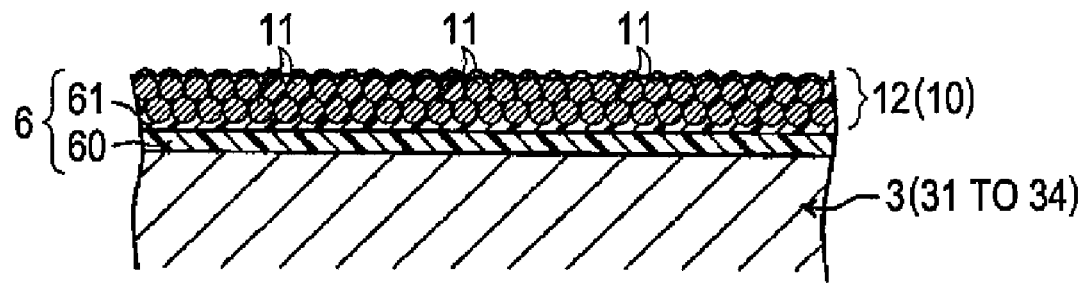
FIG. 8B is a cross-sectional view taken along a line VIIIb-VIIIb in FIG. 8A.

As can be seen from comparison of FIG. 7A and FIG. 8A and comparison of FIG. 7B and FIG. 8B, when the pressing members 31 to 34 are moved in the outward radial direction, the release sheet 60 in tight contact with the surface of the pressing member 31 is moved in the outward radial direction and, therefore, the resin layer 61 is moved in the outward radial direction. In this case, the resin layer 61 is semi-cured, and the viscosity of the resin layer 61 is increased due to the applied heat. In addition, the reinforcing yarn 10 has a small coefficient of linear expansion. Accordingly, the resin layer 61 is displaced so as to be closer to the reinforcing yarn 10 and, therefore, the reinforcing yarn 10 is embedded in the resin layer 61.

Since the reinforcing yarn 10 is wound around the supporter 3 (the resin layer 61), the reinforcing yarn 10 is not separated into each pieces when the reinforcing yarn 10 is embedded in the resin layer 61. In addition, the neighboring pieces of the reinforcing yarns 10 are not excessively apart or do not stay apart from each other. Consequently, the produced prepreg sheet is not easily broken along the fibers and, therefore, the produced prepreg sheet has a good strength.

Furthermore, in existing methods, ease of handling of the reinforcing yarn is degraded in order to maintain the reinforcing yarn to be parallel before the reinforcing yarn 10 is embedded in the resin layer 61. However, by using the method in which the reinforcing yarn 10 is wound around the supporter 3, the ease of handling is increased.

Figure 9A:
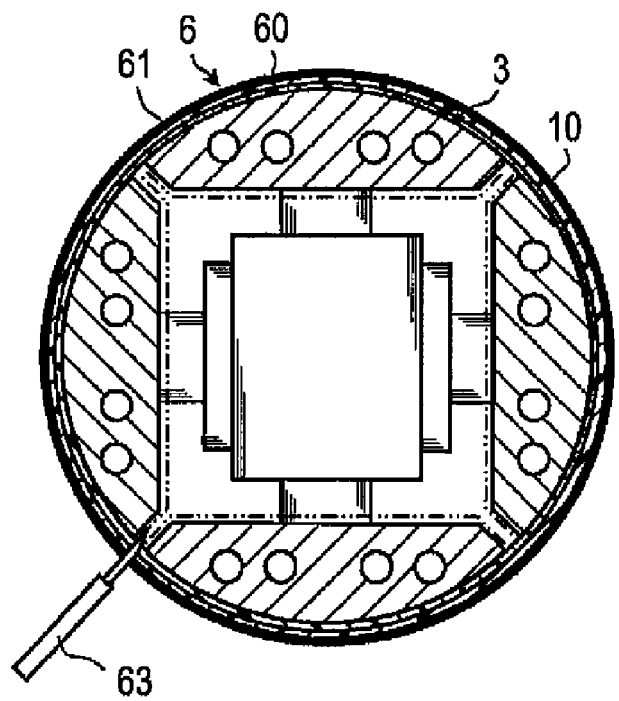
FIGS. 9A and 9B are perspective views illustrating a step of removing, from the supporter, a prepreg intermediate member having the fiber bundle embedded therein.
Figure 9B:
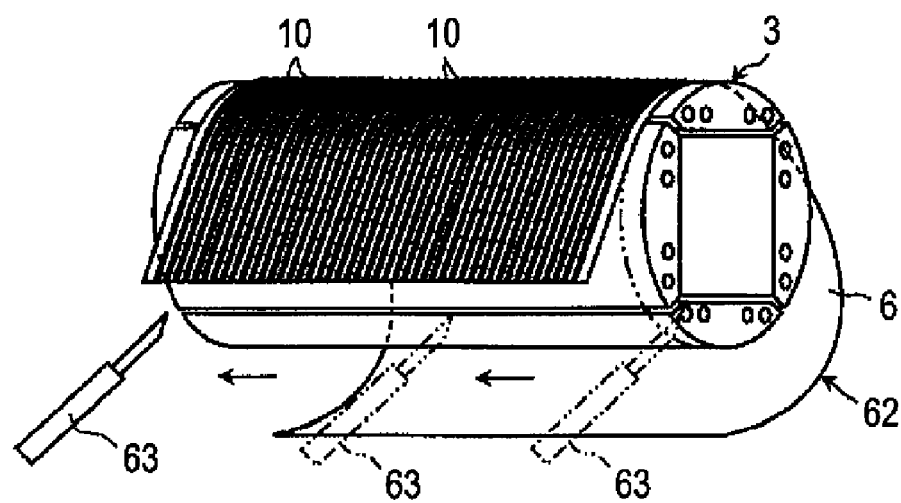

After the reinforcing yarn 10 is embedded in the resin layer 61, the pressing members 31 to 34 are cooled in order for the resin layer 61 not to be excessively cured. The pressing members 31 to 34 are cooled by passing a cooling medium through the through-holes 31B to 34B of the pressing members 31 to 34. The cooling temperature of the pressing members 31 to 34 is determined in accordance with the composition (the heat-curability) of the resin layer 61. For example, when the cure temperature of the resin layer 61 is higher than or equal to 150° C., the cooling temperature is set to a temperature higher than or equal to 10° C. and lower than or equal to 30° C.

subsequently, as shown in FIGS. 9A and 9B, the resin sheet 6 (a first prepreg intermediate member 62) having the reinforcing yarn 10 embedded therein is removed from the supporter 3. The first prepreg intermediate member 62 is removed by cutting the reinforcing yarn 10 at a portion of the resin sheet 6 where one end of the resin sheet 6 faces the other end using a cutting element 63, such as a cutter. The first prepreg intermediate member 62 removed from the supporter 3 in such a manner is curled.

Figure 10A:
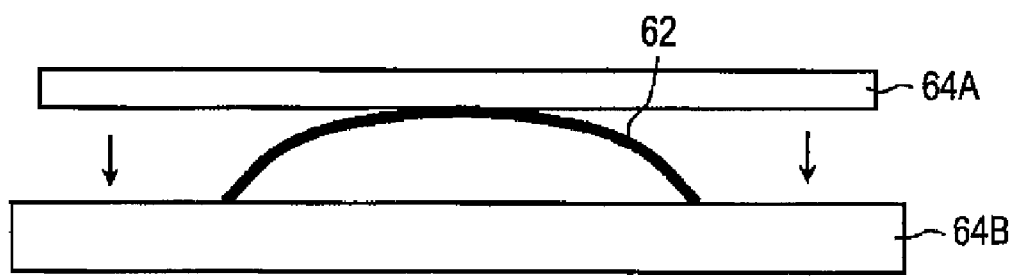
FIGS. 10A and 10B are front views illustrating a step of planarizing a UD prepreg intermediate member using a press machine.
Figure 10B:
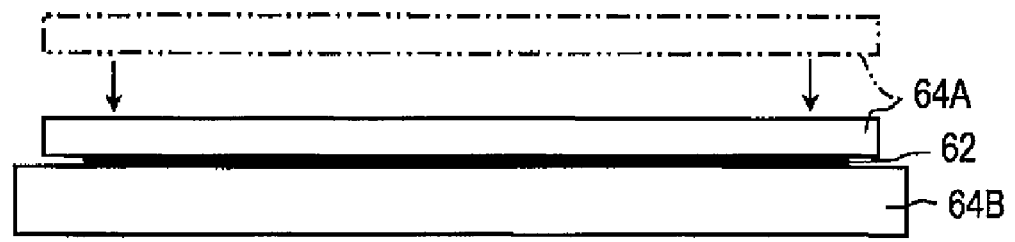
Figure 10C:
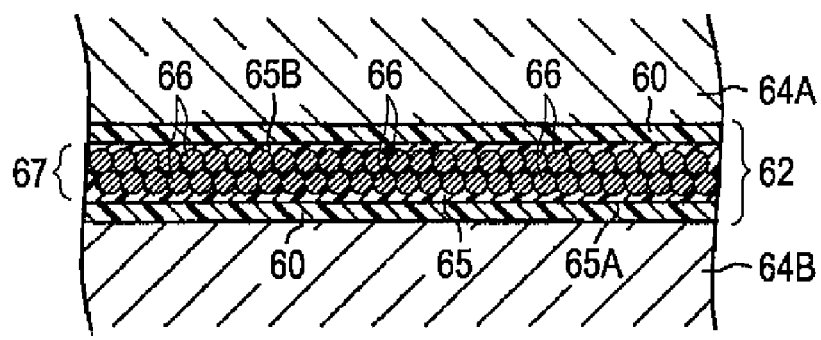
FIG. 10C is an enlarged cross-sectional view of a main portion of the prepreg intermediate member pressed by the press machine.

Subsequently, as shown in FIGS. 10A to 10C, a planarizing process is performed on the first prepreg intermediate member 62 in order to remove the curl from the first prepreg intermediate member 62. In the planarizing process, the first prepreg intermediate member 62 is hot-pressed in dies 64A and 64B of a hot press machine, for example, at a temperature higher than or equal to 60° C. and lower than or equal to 150° C. The pressure force is, for example, higher than or equal to 0.5 MPa and lower than or equal to 5 MPa.

Note that the planarized first prepreg intermediate member 62 includes a fiber layer 67 embedded in a matrix resin 65, and the fiber layer 67 includes a plurality of fibers 66 aligned in parallel. In addition, the planarized first prepreg intermediate member 62 includes the release sheet 60 bonded to a surface 65A of the matrix resin 65. The first prepreg intermediate member 62 having such a structure has a sufficient flatness of the surface 65A of the matrix resin 65 due to the release sheet 60. Furthermore, the first prepreg intermediate member 62 has a sufficient flatness of a surface 65B through the planarizing process. Accordingly, if the release sheet 60 is peeled off, the first prepreg intermediate member 62 can be used as a UD prepreg sheet.

Figure 11A:
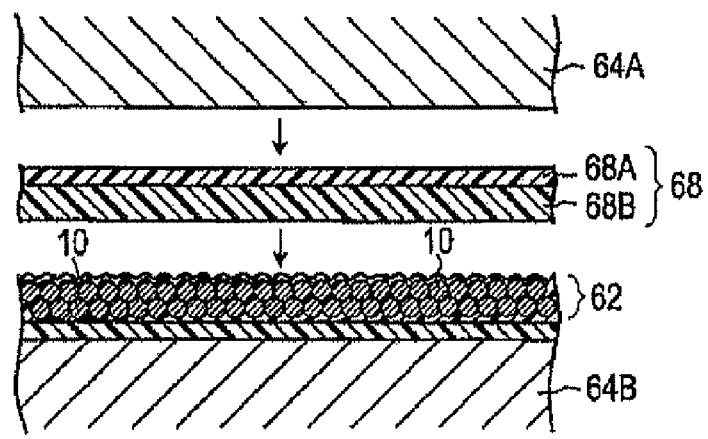
FIGS. 11A to 11C are cross-sectional views illustrating a step of bonding a resin sheet to a prepreg intermediate member.
Figure 11B:
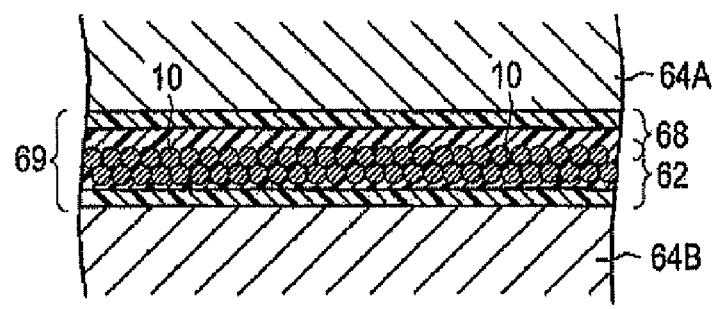

In addition, as shown in FIGS. 11A and 11B, when the planarizing process is performed or after the planarizing process is performed, another planarizing process may be performed on the first prepreg intermediate member 62 on the side of the reinforcing yarn 10. In this way, a second prepreg intermediate member 69 can be produced. In the planarizing process, a resin sheet 68 is placed on the first prepreg intermediate member 62 on the side of the reinforcing yarn 10. Thereafter, the resin sheet 68 is hot-pressed in the dies 64A and 64B of the hot press machine, for example, at a temperature higher than or equal to 60° C. and lower than or equal to 150° C. The pressure force is, for example, higher than or equal to 0.5 MPa and lower than or equal to 5 MPa.

In this case, for example, the resin sheet 68 includes a release sheet 68A having a resin layer 68B formed thereon. It is desirable that the resin layer 68B has a larger amount of filler, a higher melt viscosity, or a higher heat curability than the matrix resin 65 (the resin layer 61) of the first prepreg intermediate member 62.

In this case, for example, the amount of filler contained in the resin layer 68B is higher than or equal to 25 vol % and lower than or equal to 70 vol %. In addition, for example, the amount of filler contained in the matrix resin 65 (the resin layer 61) is higher than or equal to 0 vol % and lower than or equal to 50 vol %.

The filler is formed of solid particles mixed with resin. The filler mixed with the resin layer 68B can reduce lifting of the reinforcing yarn 10 included in the first prepreg intermediate member 62. By setting the amount of filler contained in the resin layer 68B to 25 vol % or higher, the effect of the filler in reducing the lifting can be increased. Accordingly, cracking between the neighboring reinforcing yarns 10 is less likely to occur. In addition, by setting the amount of filler contained in the resin layer 68B to 70 vol % or lower, the adhesiveness of the resin sheet 68 can be effectively maintained. Accordingly, the first prepreg intermediate member 62 is not peeled off from the resin sheet 68.

The filler mixed with the matrix resin 65 (the resin layer 61) can reduce heat expansion of the matrix resin 65 (the resin layer 61). Accordingly, the amount of filler contained in the matrix resin 65 (the resin layer 61) is set to 0 vol % or higher. In this way, when the prepreg sheet according to the present embodiment is employed as part of a circuit board, the difference between the coefficients of thermal expansion of the circuit board and a silicon chip mounted on the circuit board can be reduced. Accordingly, a good connection between the circuit board and the silicon chip can be maintained. In addition, by setting the amount of filler contained in the matrix resin 65 (the resin layer 61) to 50 vol % or lower, entry of resin, which is part of the resin layer 61, into a space between the neighboring reinforcing yarns 10 can be facilitated. Accordingly, a gap between the neighboring reinforcing yarns 10 is less likely to be formed.

For example, the melt viscosity of the resin layer 68B is set to a value higher than or equal to 7,000 Pa·s and lower than or equal to 20,000 Pa·s. In addition, for example, the melt viscosity of the matrix resin 65 (the resin layer 61) is set to a value higher than or equal to 100 Pa·s and lower than or equal to 5,000 Pa·s.

By setting the melt viscosity of the resin layer 68B to 7,000 Pa·s or higher, lifting of the reinforcing yarn 10 in the resin layer 68B due to reduction in the volume of the reinforcing yarn 10 can be reduced. In addition, by setting the melt viscosity of the resin layer 68B to 20,000 Pa·s or lower, the adhesiveness of the resin sheet 68B to the matrix resin 65 (the resin layer 61) can be effectively maintained.

By setting the melt viscosity of the matrix resin 65 (the resin layer 61) to 100 Pa·s or higher, resin negligibly flows out through a space between the neighboring reinforcing yarns 10 when the matrix resin 65 (the resin layer 61) is pressed using a hot press machine. Accordingly, the reinforcing yarns 10 are less likely to move and, therefore, spacing between the reinforcing yarns 10 can be maintained constant. In addition, by setting the melt viscosity of the matrix resin 65 (the resin layer 61) to 5,000 Pa·s or lower, resin can easily flow into a space between the reinforcing yarns 10. Accordingly, a gap between the neighboring reinforcing yarns 10 is less likely to be formed.

For example, the heat curability of the resin layer 68B is set to a value higher than or equal to 40% and lower than or equal to 95%. In addition, for example, the heat curability of the matrix resin 65 (the resin layer 61) is set to a value higher than or equal to 0% and lower than or equal to 30%.

Uncured resin is cured because low molecular weight resins called monomers or oligomers in the uncured resin are combined with one another into a high molecular weight resin. If molecules having high molecular weight are present in the resin layer 68B, the molecules having high molecular weight press the reinforcing yarn 10 in the matrix resin 65 (the resin layer 61). Accordingly, lifting of the reinforcing yarn 10 can be reduced. Thus, by setting the heat curability of the resin layer 68B to 40% or higher, the number of molecules having high molecular weight can be increased and, therefore, the adhesiveness of the resin layer 68B to the reinforcing yarns 10 can be effectively maintained. In addition, by setting the heat curability of the resin layer 68B to 95% or lower, the adhesiveness of the resin layer 68B to the reinforcing yarn 10 can be effectively maintained while maintaining the adhesiveness of the resin layer 68B to the resin layer 68B (the resin layer 61).

In addition, since the matrix resin 65 (the resin layer 61) has a function of securing the reinforcing yarn 10, the resin needs to flow into the entire space between the reinforcing yarns 10. Accordingly, by setting the heat curability of the matrix resin 65 (the resin layer 61) to 30% or lower, the number of molecules having high molecular weight can be reduced. Thus, the resin can easily flow into the space between the reinforcing yarns 10. As a result, a gap between the reinforcing yarns 10 is negligibly formed and, therefore, a prepreg sheet having few gaps can be produced.

Furthermore, the thickness of a region of the matrix resin 65 (the resin layer 61) where the reinforcing yarn 10 is not embedded is set to a value greater than or equal to 5 μm and less than or equal to 25 μm. By setting the thickness of the region where the reinforcing yarn 10 is not embedded to 5 μm or greater, lifting of the reinforcing yarns 10 can be reduced and, therefore, cracking in the matrix resin 65 (the resin layer 61) can be significantly reduced. In addition, by setting the thickness of the region where the reinforcing yarn 10 is not embedded to 25 μm or less, the coefficient of thermal expansion of a produced prepreg sheet can be decreased. As a result, when the produced prepreg sheet is employed as part of a circuit board, the difference between the coefficients of thermal expansion of the circuit board and a silicon chip can be reduced. Accordingly, a good connection between the circuit board and the silicon chip can be maintained.

Figure 11C:
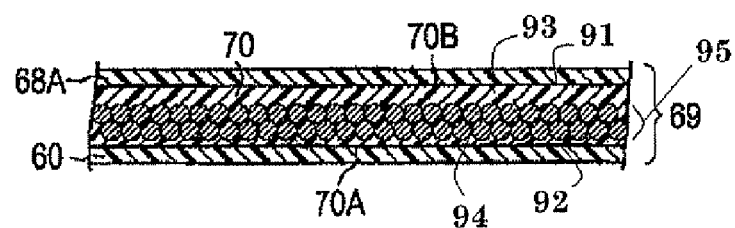

As shown in FIG. 11C, the planarized first prepreg intermediate member 62 (a second prepreg intermediate member 69) includes a matrix resin 70 and the release sheets 60 and 68A bonded to surfaces 70A and 70B of the matrix resin 70, respectively. Since the second prepreg intermediate member 69 having such a structure includes the release sheets 60 and 68A and a planarizing process is performed, a sufficient flatness of the surfaces 70A and 70B is provided. If the release sheets 60 and 68A are peeled off, the second prepreg intermediate member 69 can be used as a UD prepreg sheet. A first surface 91, a second surface 92, a first region 93, a second region 94, and a fiber region 95 are shown.

In addition, when the resin layer 68B of the resin sheet 68 has a larger amount of filler, a higher melt viscosity, or a higher heat curability than the matrix resin 65 (the resin layer 61) of the first prepreg intermediate member 62, the resin layer 68B located on the side of the resin sheet 68 of the second prepreg intermediate member 69 (on the side pressed by the die 64A) has a higher hardness or a lower fluidity than the matrix resin 65 (the resin layer 61). Accordingly, when the resin sheet 68 is bonded to the first prepreg intermediate member 62, the reinforcing yarns are not exposed through a surface 69B of the resin layer 68B, or roll of the surface caused by the reinforcing yarns 10 can be reduced. As a result, by performing a planarizing process using the resin sheet 68 having the above-described characteristic, a more suitable smoothness of the surface 69B can be obtained.

Figure 12C:
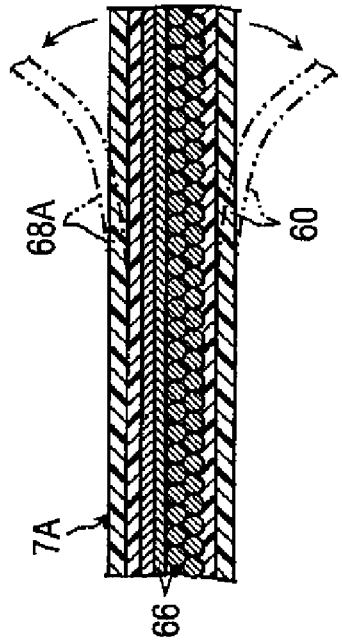
FIGS. 12B and 12C are cross-sectional views of a main portion of the integrated prepreg intermediate members.
Figure 12B:
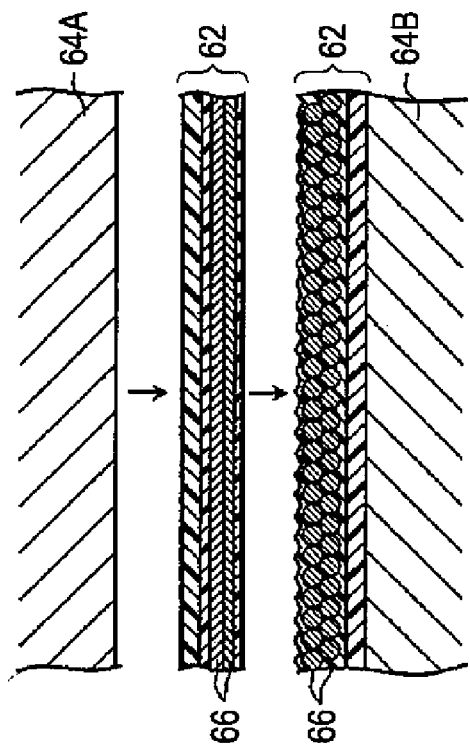
Figure 12A:
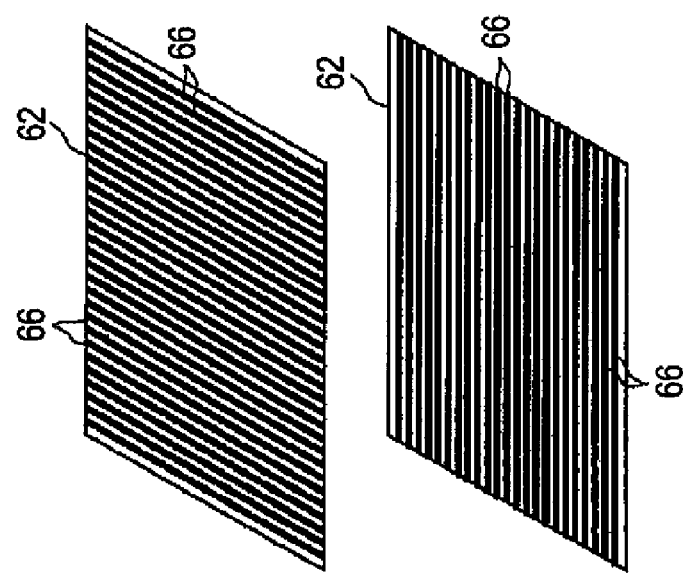
FIG. 12A is a perspective view illustrating a step of integrating prepreg intermediate members having different alignment direction of fiber bundles together.

As shown in FIGS. 12A and 12B, if two first prepreg intermediate members 62 are connected to each other so that the alignment direction of a plurality of the fibers 66 are perpendicular to each other, the two first prepreg intermediate members 62 can be used as a crisscrossed UD prepreg sheet 7A. The two first prepreg intermediate members 62 can be bonded using the hot press machines 64A and 64B that are used in the planarizing process.

When the two first prepreg intermediate members 62 are bonded together, one of the first prepreg intermediate members 62 may include the resin layer 61 having a characteristic different from the resin layer 61 of the other first prepreg intermediate member 62. More specifically, the resin layers 61 of the two first prepreg intermediate members 62 may have different amounts of filler, different melt viscosity values, or different heat curability values. In this case, it is only required that the amount of filler, the melt viscosity value, or the heat curability value of the resin layer 68B is within the above-described range. However, in heat pressing using the hot press machines 64A and 64B, the resin layer 62 adjacent to the die 64A that moves and presses from above downward has an larger amount of filler, a higher melt viscosity value, or a higher heat curability value than the resin layer 61 adjacent to the fixed die 64B. With such a method, the smoothness of the surface of the resin layer 62 adjacent to the die 64A can be further increased.

In place of connecting the two first prepreg intermediate members 62 to each other, the first prepreg intermediate member 62 may be connected to the second prepreg intermediate member 69 (refer to FIG. 11C), or two second prepreg intermediate members 69 (refer to FIG. 11C) may be connected to each other. In this way, a crisscrossed UD prepreg sheet can be formed.

Alternatively, a crisscrossed UD prepreg sheet can be formed using the first prepreg intermediate member 62 or the second prepreg intermediate member 69 and using the prepreg sheet manufacturing apparatus X as follows.

Figure 13:
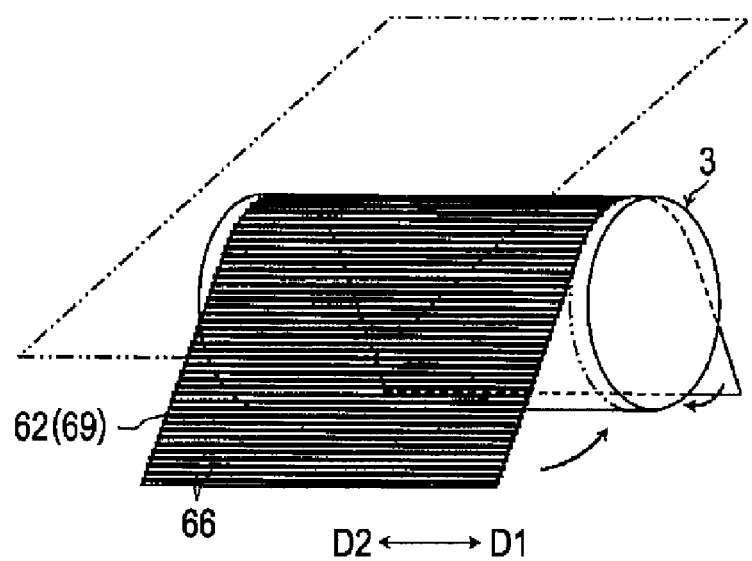
FIG. 13 is a perspective view illustrating a step of securing a prepreg intermediate member to the supporter.

First, as shown in FIG. 13, the intermediate prepreg member 62 (69) is wound around the supporter 3. In this case, the intermediate prepreg member 62 (69) is wound so that a plurality of the fibers 66 extend in the axis directions D1 and D2 of the supporter 3.

Figure 14A:
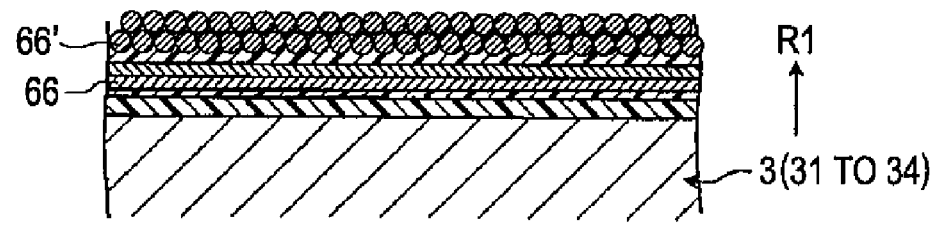
FIG. 14A is a cross-sectional view of the prepreg intermediate member having the fiber bundle wound therearound and corresponds to FIG. 7B.

Subsequently, as described above, a reinforcing yarn is wound around the intermediate prepreg member 62 (69) so that, as shown in FIG. 14A, a plurality of fibers 66' are perpendicular to the plurality of fibers 66.

Figure 14B:
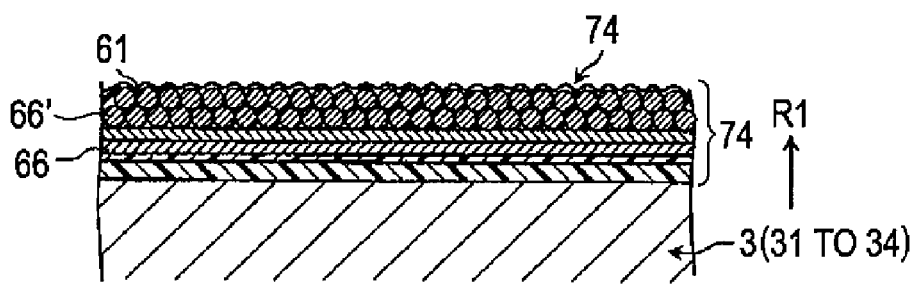
FIG. 14B illustrates the prepreg intermediate member having the fiber bundle embedded therein and corresponds to FIG. 8B.
Figure 15:
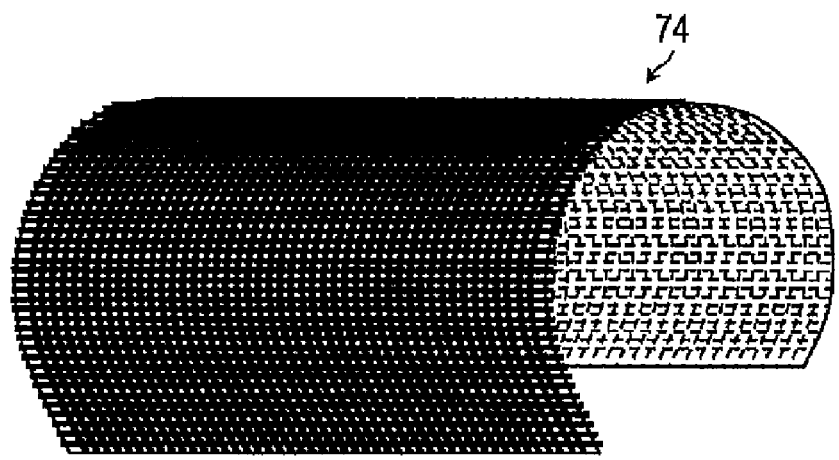
FIG. 15 is a perspective view illustrating the prepreg intermediate member removed from the supporter.
Figure 16A:
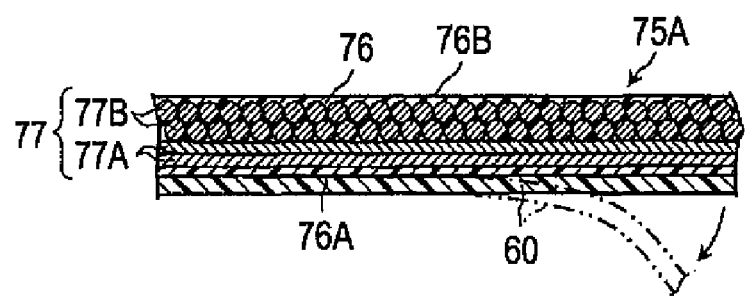
FIG. 16A is a cross-sectional view of a main portion of a planarized prepreg intermediate member.

Subsequently, the pressing members 31 to 34 are heated and moved in the outward radial direction R1 of the supporter 3. As shown in FIG. 14B, the plurality of fibers 66' are then embedded in the resin layer 61. In this way, crisscrossed UD prepreg intermediate member 74 can be achieved. Thereafter, as shown in FIG. 15, the crisscrossed UD prepreg intermediate member 74 is removed from the supporter 3. In a manner similar to the above-described manner, a planarizing process is performed. Thus, a crisscrossed UD prepreg sheet 75A shown in FIG. 16A is produced. By performing a planarizing process as needed, a crisscrossed UD prepreg sheet 75B shown in FIG. 16B is produced.

As shown in FIG. 16A, a planarized crisscrossed UD prepreg sheet 75 includes a fiber layer 77 embedded in a matrix resin 76, and the fiber layer 77 includes parallel fiber groups 77A and 77B having different alignment directions. In addition, the planarized crisscrossed UD prepreg sheet 75 includes the release sheet 60 bonded to a surface 76A of the matrix resin 76. Accordingly, the planarized crisscrossed UD prepreg sheet 75 has a sufficient flatness of the surface 76A of the matrix resin 76 due to the release sheet 60. Furthermore, the crisscrossed UD prepreg sheet 75 has a sufficient flatness of a surface 76B through the planarizing process.

Figure 16B:
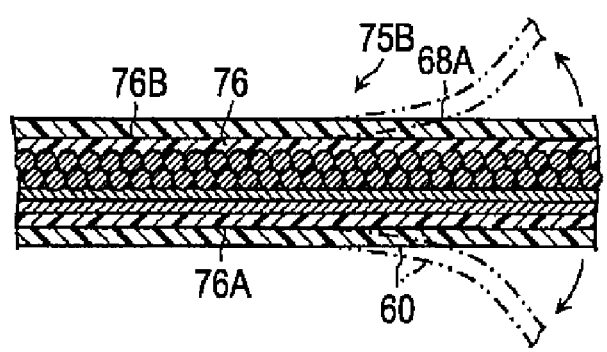
FIG. 16B is a cross-sectional view of a main portion of the resin sheet integrated into the prepreg intermediate member.

In order to produce the planarized crisscrossed UD prepreg sheet 75B, as shown in FIG. 16B, the release sheet 68A is bonded to the surface 76B of the matrix resin 76 in addition to the release sheet on the surface 76A in the crisscrossed UD prepreg sheet 75A shown in FIG. 16A. In the crisscrossed UD prepreg sheet 75B having such a structure, the release sheets 60 and 68A are bonded to the surfaces 76A and 76B of the matrix resin 76, respectively, and the planarizing process is performed. Accordingly, a sufficient flatness of the surfaces 76A and 76B of the matrix resin 76 can be provided.

In the planarizing process, the resin layer of the matrix resin 76 adjacent to the release sheet 68B may have a large amount of filler, a higher melt viscosity value, or a higher heat curability value than the resin layer of the matrix resin 76 adjacent to the release sheet 60. In this case, it is only required that the amount of filler, the melt viscosity value, or the heat curability value of each of the resin layers is in the above-described range. With such a method, the smoothness of the surface of the resin layer of the matrix resin 76 adjacent to the die 64A can be further increased.

Figure 17A:
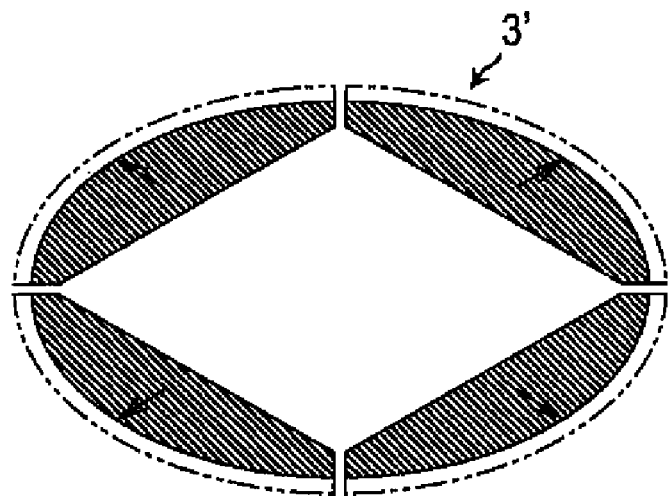
FIGS. 17A and 17B are cross-sectional views illustrating another example of the supporter.
Figure 17B:
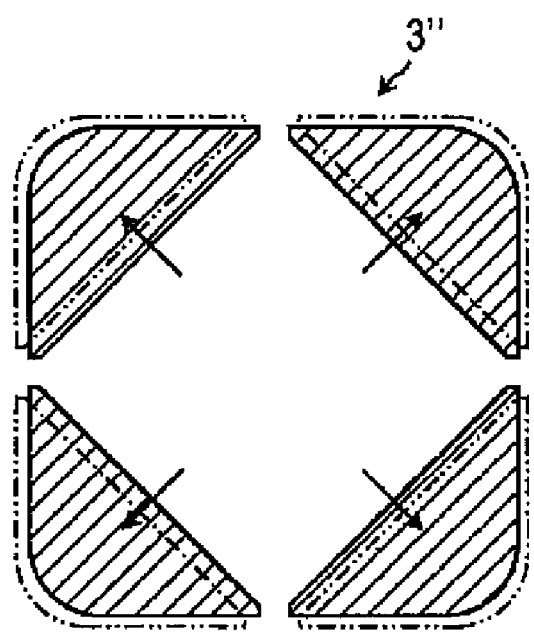

The present invention is not limited to the above-described embodiment, but a variety of modifications are made to the described embodiment. The cross section of the supporter may be non-circular (e.g., an elliptical cross section of a supporter 3' as shown in FIG. 17A) or polygonal (e.g., a rectangular cross section of a supporter 3" as shown in FIG. 17B). In addition, the number of the pressing members 31 to 34 (refer to FIG. 2) is not limited to four, but may be any number. Furthermore, the resin sheets 6 and 68 that do not include the release sheets 60 and 68A, respectively, may be employed.

A second embodiment of the present invention is described next with reference to FIGS. 18 and 19.

Figure 19:
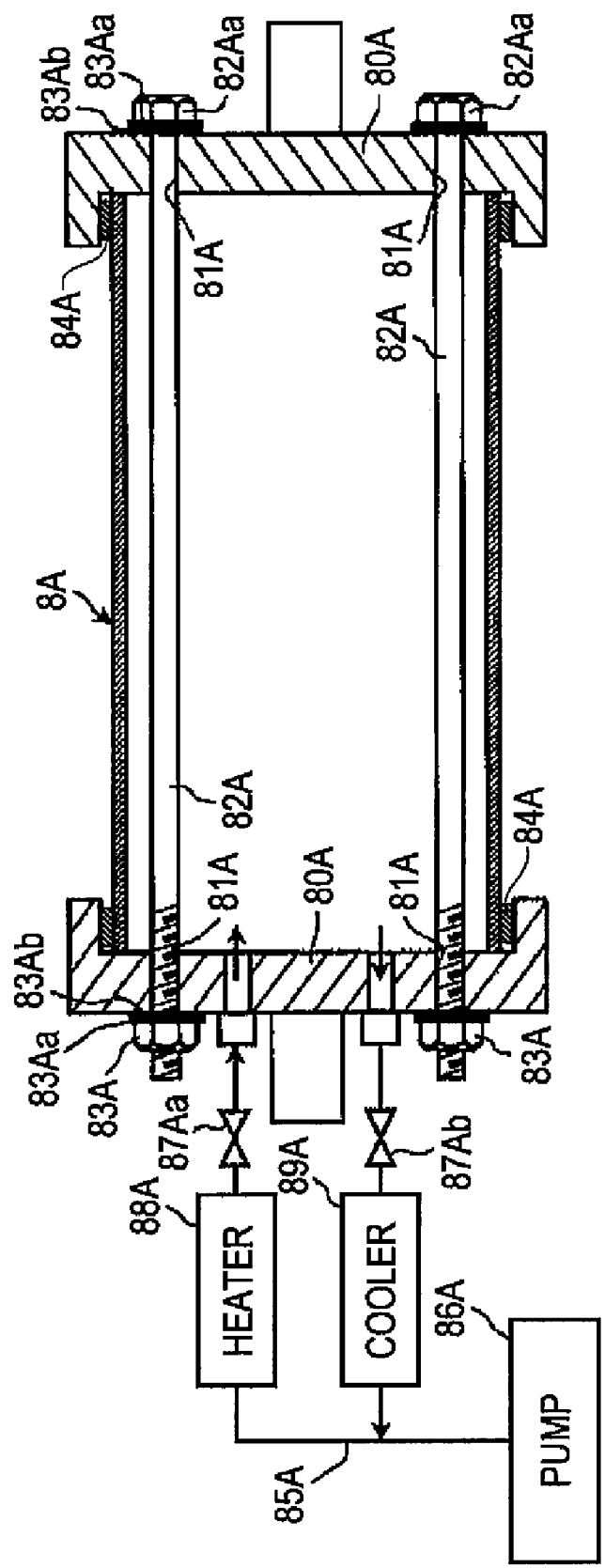
FIG. 19 is a cross-sectional view of the supporter and the vicinity of the supporter and a schematic illustration of an oil pressure unit connected to the supporter.

An example shown in FIGS. 18 and 19 is different from the above-described prepreg sheet manufacturing apparatus X (refer to FIGS. 1 to 3) in terms of a structure that increases the diameter of a supporter 8A.

The supporter 8A is an integrated cylindrical member having either end open. The diameter is, for example, greater than or equal to 10 cm and less than or equal to 2 m. The thickness is, for example, greater than or equal to 1 mm and less than or equal to 5 mm. The supporter 8A is formed of a material having an amount of thermal expansion within the range of the elastic limit when the supporter 8A is expanded to a desired size (a desired diameter). An example of the material is a metal such as stainless steel.

Two flanges 80A are attached to either end of the supporter 8A. Thus, the open ends of the supporter 8A are closed. The two flanges 80A are secured to the supporter 8A by inserting bolts 82A into through-holes 81A and tightening nuts 83A onto the bolts 82A. A washer 83Aa and a packing 83Ab are disposed between a head portion 82Aa of each of the bolts 82A and one of the flanges 80A and between each of the nuts 83A and the other flange 80A. In this way, the airtightness of the supporter 8A can be ensured. In addition, an O-ring 84A is disposed between each of the flanges 80A and the supporter 8A. The O-rings 84A further ensure the airtightness of the supporter 8A.

The inside of the supporter 8A is filled with an incompressible pressure medium or a nearly incompressible pressure medium. In addition, the inside of the supporter 8A is connected to a pump 86A via a pipe 85A. The pressure medium is pressurized by the pump 86A and flows into or out of the supporter 8A via valves 87Aa and 87Ab provided in the middle of the pipe 85A. In order to outwardly apply a pressure force to the inner surface of the supporter 8A, the pressure medium is heated by a heater 88A and is injected into the supporter 8A by the pump 86A. Accordingly, the supporter 8A is heated. When a resin layer is formed on the surface of the supporter 8A, the resin layer is heated and, therefore, the viscosity of the resin layer is increased. In addition, the pressure medium discharged from the supporter 8A is cooled by a cooler 89A.

Examples of the pressure medium include a variety of types of oil used for oil pressure pumps, water, and air. An oil pressure pump can be used as the pump 86A. In a case that the supporter 8A made of stainless steel having the thickness of several millimeters has the amount of expansion set to several micrometers which is within the elastic limit of the supporter 8A, the pressure applied to the pressure medium by the pump 86A is set to, for example, a value greater than or equal to 10 N/cm² and less than or equal to 100 N/cm² when the supporter 8A is expanded.

According to the above-described structure, the valve 87Aa is open while the valve 87Ab is closed. Thereafter, the pressure medium heated by the heater 88A is injected into the supporter 8A by the power of the pump 86A at a pressure higher than or equal to a predetermined pressure. In this way, the supporter 8A can be heated, and the diameter of the supporter 8A can be increased. Accordingly, when a resin layer is formed on the surface of the supporter 8A and a reinforcing yarn is wound around the resin layer, the viscosity of the resin layer can be increased, and the reinforcing yarn can be embedded in the resin layer.

In addition, when embedding of the reinforcing yarn in the resin layer is completed, the valves 87Aa and 87Ab and the pump 86A are controlled so that the pressure medium is cooled by the cooler 89A. Thus, the pressure applied to the inner surface of the supporter 8A is decreased to a predetermined value or lower.

Figure 20A:
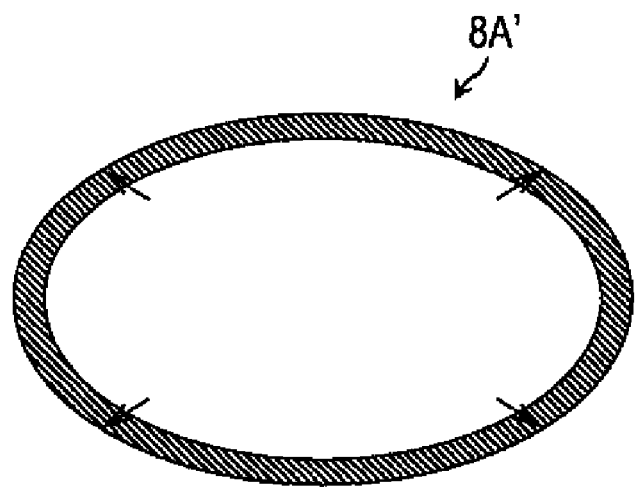
FIGS. 20A and 20B are cross-sectional views illustrating another example of the supporter.
Figure 20B:
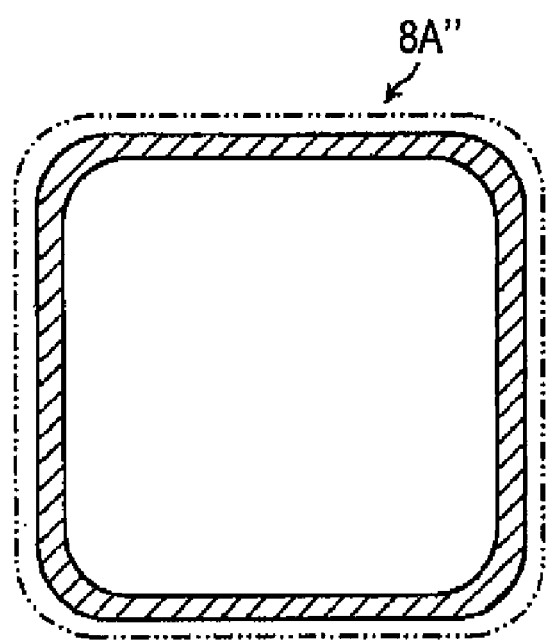

In addition to a cylindrical shape, the supporter 8A can have a tubular shape with a non-circular cross section (e.g., an elliptical cross section of a supporter 8A' as shown in FIG. 20A, or a rectangular cross section of a supporter 8A" as shown in FIG. 20B).

A third embodiment of the present invention is described next with reference to FIGS. 21 and 22.

Figure 21:
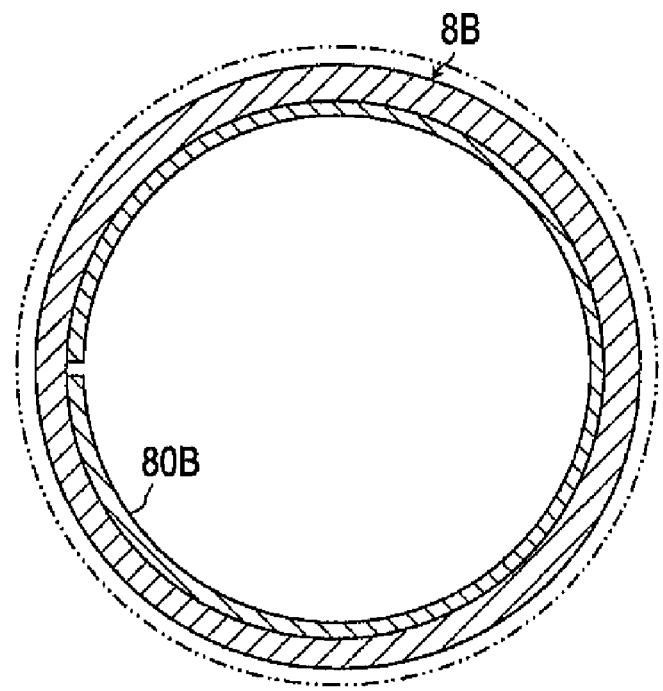
FIG. 21 is a cross-sectional view illustrating a supporter and the vicinity of the supporter according to a third embodiment of the present invention.
Figure 22:
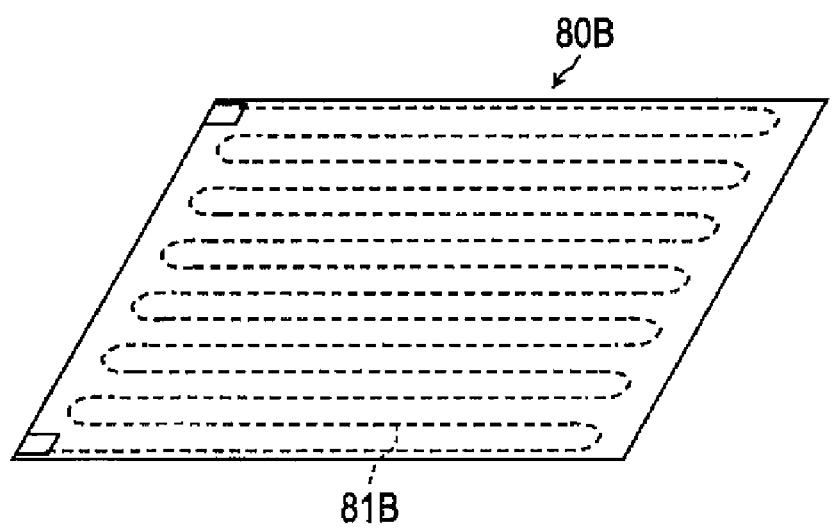
FIG. 22 is a perspective view of a heater incorporated in the supporter shown in FIG. 21.

In the example shown in FIGS. 21 and 22, a structure is illustrated in which a supporter 8B is expanded in the radial direction using a sheet heater 80B, and a reinforcing yarn is embedded in a resin layer.

The sheet heater 80B includes a meandering heating wire 81B disposed between sheet members having a high heat conductivity. The sheet heater 80B is flexible. The sheet heater 80B is rolled into a cylindrical shape, and is disposed so as to be in tight contact with the inner surface of the supporter 8B.

The supporter 8B is formed of a material that expands due to heat. The amount of expansion required for the supporter 8B can be determined in accordance with, for example, a resin layer formed on the supporter 8B and the diameter of the supporter 8B. For example, the supporter 8B may have a linear coefficient of expansion higher than or equal to 10 ppm/° C. and lower than or equal to 50 ppm/° C. However, the supporter 8B is formed of a material that does not soften or melt at a heating temperature of the sheet heater 80B. The heating temperature of the sheet heater 80B is determined by the linear coefficient of expansion of the supporter 8B, an amount of expansion required for the supporter 8B, the composition of the resin layer formed on the supporter 8B. For example, the heating temperature of the sheet heater 80B is set to a value higher than or equal to 50° C. and lower than or equal to 140° C. The supporter 8B can be formed of a metal, such as aluminum, titanium, alloys thereof, iron, an iron-based alloy (e.g., stainless steel), a nickel-based ally, or a cobalt-based alloy. Alternatively, the supporter 8B can be formed of a resin material, such as polyimide, polycarbonate, phenol, and PPO.

In the above-described structure, by heating the supporter 8B using the sheet heater 80B, the diameter of the supporter 8B can be increased. Accordingly, when a resin layer is formed on the surface of the supporter BB and a reinforcing yarn is wound around the resin layer, the viscosity of the resin layer can be increased, and the reinforcing yarn can be embedded in the resin layer.

Like the second embodiment, the supporter 8B can have a tubular shape with a non-circular cross section (e.g., an elliptical cross section as shown in FIG. 20A, or a rectangular cross section as shown in FIG. 20B).

A fourth embodiment of the present invention is described next with reference to FIGS. 23A and 23B.

Figure 23A:
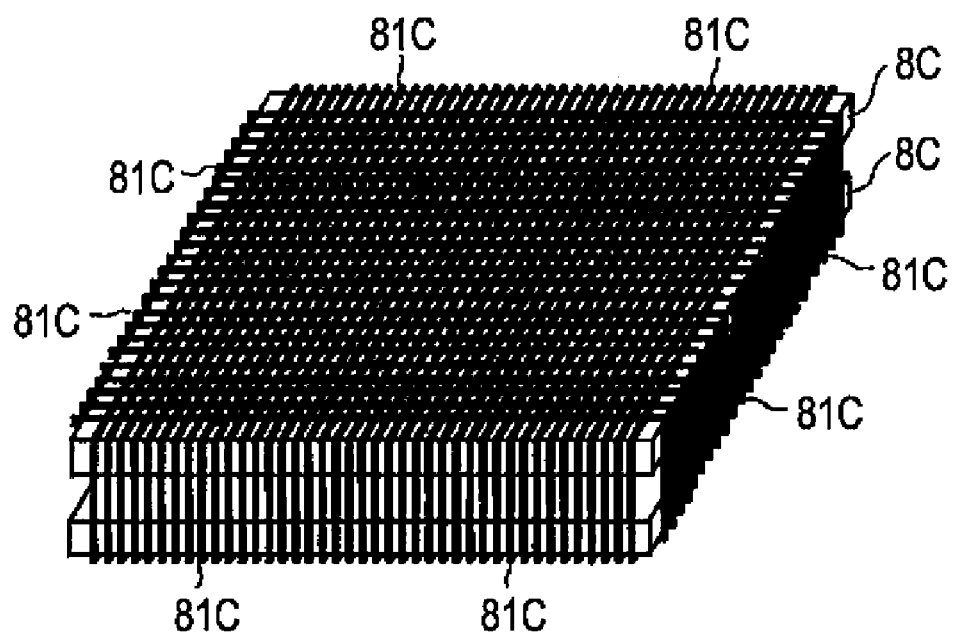
FIG. 23A is a perspective view illustrating a supporter and the vicinity of the supporter according to a fourth embodiment of the present invention.
Figure 23B:
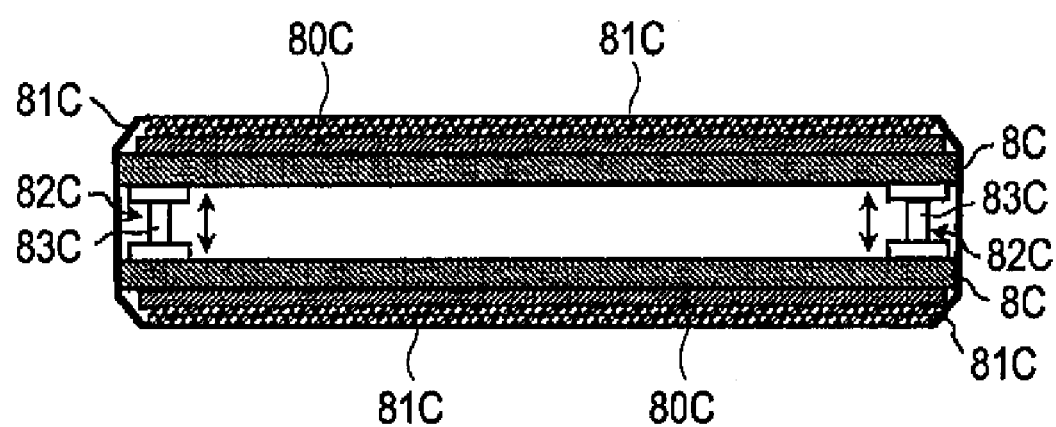
FIG. 23B is a longitudinal sectional view of FIG. 23A.

In the example shown in FIGS. 23A and 23B, a structure is illustrated in which a reinforcing yarn 81C is embedded in a resin layer 80C using a pair of plate members 8C.

The two plate members 8C form a supporter. A piston mechanism 82C is disposed between the two plate members 8C. That is, by moving a piston 83C of the piston mechanism 82C using, for example, an oil pressure pump, the distance between the two plate members 8C can be changed.

In the present embodiment, after the resin layer 80C is formed on each of the surfaces of the two plate members 8C, a reinforcing yarn 81C is wound around the two plate members 8C in two directions perpendicular to each other. Thereafter, by increasing the distance between the two plate members 8C using the piston mechanism 82C, the reinforcing yarn 81C arranged in the two directions is embedded in the resin layer 80C.

The reinforcing yarn 81C is not necessarily wound in two directions as illustrated in the drawing, but may be wound in a single direction.

The invention claimed is:

1. A prepreg sheet comprising a resin layer which includes:
a first surface;
a second surface; and
a fiber region between the first surface and the second surface;
a first region between the first surface and at least a portion of the fiber region, wherein the first region overlaps the fiber region; and
a second region between the second surface and at least a portion of the fiber region, wherein the second region overlaps the fiber region,
wherein the second region contains more filler than the first region.

2. The prepreg sheet according to claim 1, wherein at least one of the first region and the second region includes a region that does not contain the fiber layer region, and the thickness of the region is greater than or equal to 5 μM and less than or equal to 25 μm.

3. The prepreg sheet according to claim 1, wherein the second region is thicker than the first region.

4. The prepreg sheet according to claim 1, wherein the fiber region includes a first fiber group comprising a plurality of fibers which are substantially parallel.

5. The prepreg sheet according to claim 4, wherein the fiber region further includes a second fiber group comprising a plurality of fibers which are substantially perpendicular to the fiber of the first fiber group, and the second fiber group is located closer to the second region of the fiber region than the first fiber group is.

6. The prepreg sheet according to claim 4, wherein the fiber region consists of the first fiber group.

* * * * *